United States Patent [19]

Barral et al.

[11] Patent Number: 5,352,039
[45] Date of Patent: Oct. 4, 1994

[54] REMOTE TEMPERATURE AND/OR TEMPERATURE DIFFERENCE MEASURING DEVICE

[75] Inventors: Jean-Pierre Barral, Seyssins; Bernard Million, Saint-Martin-d'Hres; Francois Colomb, Grenoble, all of France

[73] Assignee: Ortomedic, Corenc, France

[21] Appl. No.: 975,566

[22] PCT Filed: Aug. 6, 1991

[86] PCT No.: PCT/FR91/00648

§ 371 Date: Mar. 17, 1993

§ 102(e) Date: Mar. 17, 1993

[87] PCT Pub. No.: WO92/02792

PCT Pub. Date: Feb. 20, 1992

[30] Foreign Application Priority Data

Aug. 6, 1990 [FR] France ................ 90 10029

[51] Int. Cl.$^5$ .......................... G01J 5/52; G01J 5/08
[52] U.S. Cl. .......................... 374/121; 374/130
[58] Field of Search .............. 374/29, 30, 229, 10, 374/121, 130

[56] References Cited

U.S. PATENT DOCUMENTS

| | | | |
|---|---|---|---|
| 3,017,513 | 1/1962 | Messelt | 250/83.3 |
| 4,005,605 | 2/1977 | Michael | 374/129 |
| 4,030,362 | 6/1977 | Dimeff | 374/129 |
| 4,078,869 | 3/1978 | Honeycutt | 33/286 X |
| 4,315,150 | 2/1982 | Darringer et al. | 250/338 |
| 4,636,093 | 1/1987 | Nagasaka et al. | 374/186 |
| 4,743,122 | 5/1988 | Yamano et al. | 374/208 |
| 4,883,364 | 11/1989 | Astheimer | 374/129 |
| 4,904,997 | 2/1990 | Chen et al. | 374/163 X |
| 4,906,105 | 3/1990 | Geake | 370/30 |
| 4,969,748 | 11/1990 | Crowley et al. | 374/129 X |
| 5,172,978 | 12/1992 | Normura et al. | 374/130 |

FOREIGN PATENT DOCUMENTS 0311148 4/1989 European Pat. Off. .
3213955A1 10/1982 Fed. Rep. of Germany .
3710486C1 8/1988 Fed. Rep. of Germany .

OTHER PUBLICATIONS

Patent Abstracts of Japan, vol. 5, No. 60 (P-58)(732) Apr. 23, 1981 (Daido Tokushuko K.K.) Feb. 10, 1981 56-14125.

*Primary Examiner*—William A. Cuchlinski, Jr.
*Assistant Examiner*—W. Morris Worth
*Attorney, Agent, or Firm*—Beveridge, DeGrandi, Weilacher & Young

[57] ABSTRACT

A remote temperature and/or temperature difference measuring device which includes a measuring circuit having a heat flux sensor for sensing the heat flow from an area on the surface of a body, and a portable housing which supports the sensor and also a device for determining or marking the area of analysis. The measuring circuit includes the heat flux sensor, a memory circuit connected to the heat flux sensor, and a storage input device such as a push button for initiating, at any given moment, the memory circuit's storage of a reference signal from the heat flux sensor. The measuring circuit also includes a comparator of which one of the inputs receives the output signals from the heat flux sensor, while the other input is connected to the memory circuit providing the reference signal. The comparator thus outputs a signal which corresponds to the difference between the reference signal and a subsequently received heat flux sensor output signal. An indicator device is also included, and it is connected to the output of the comparator for producing a signal which corresponds to the above mentioned differences. The device is especially suited for measuring the temperature on the surface of a human or animal body.

22 Claims, 5 Drawing Sheets

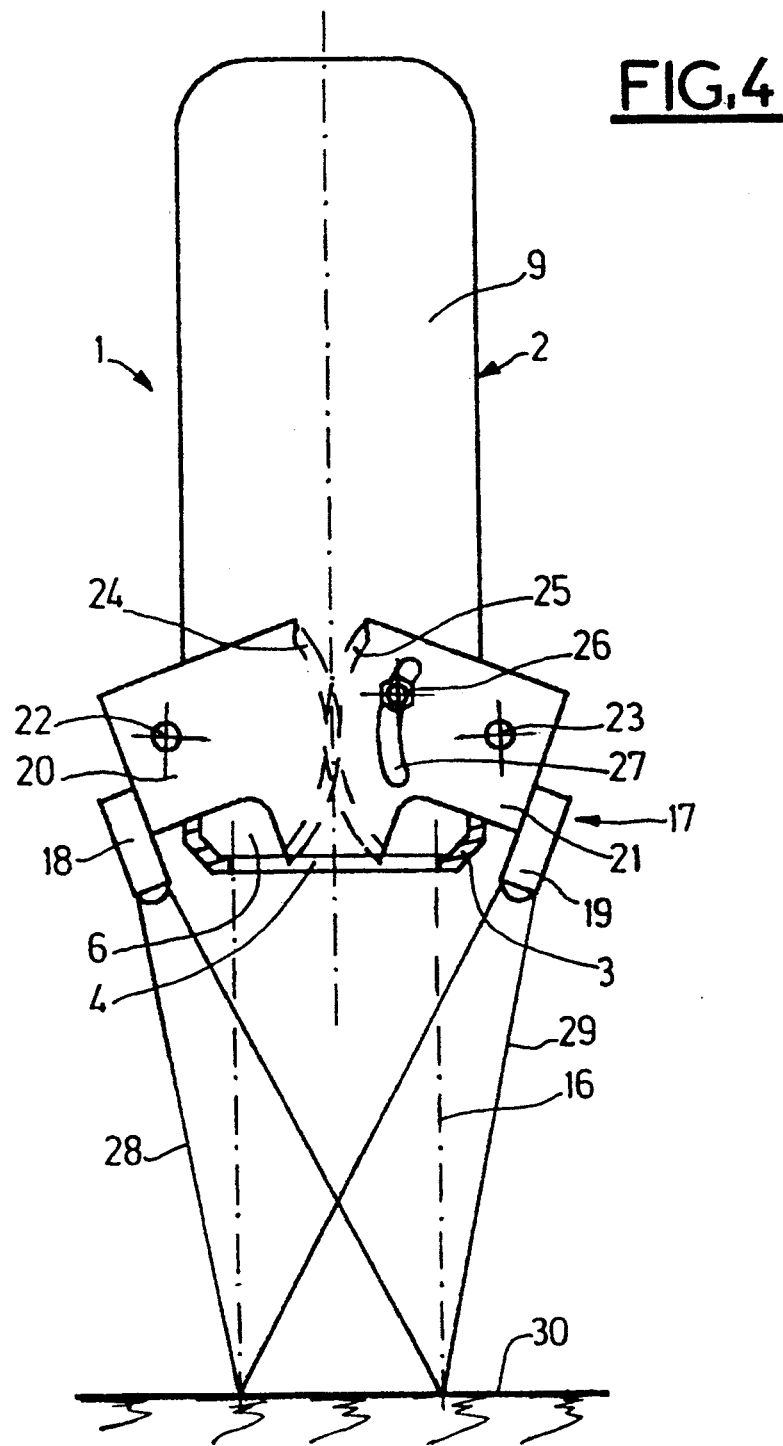

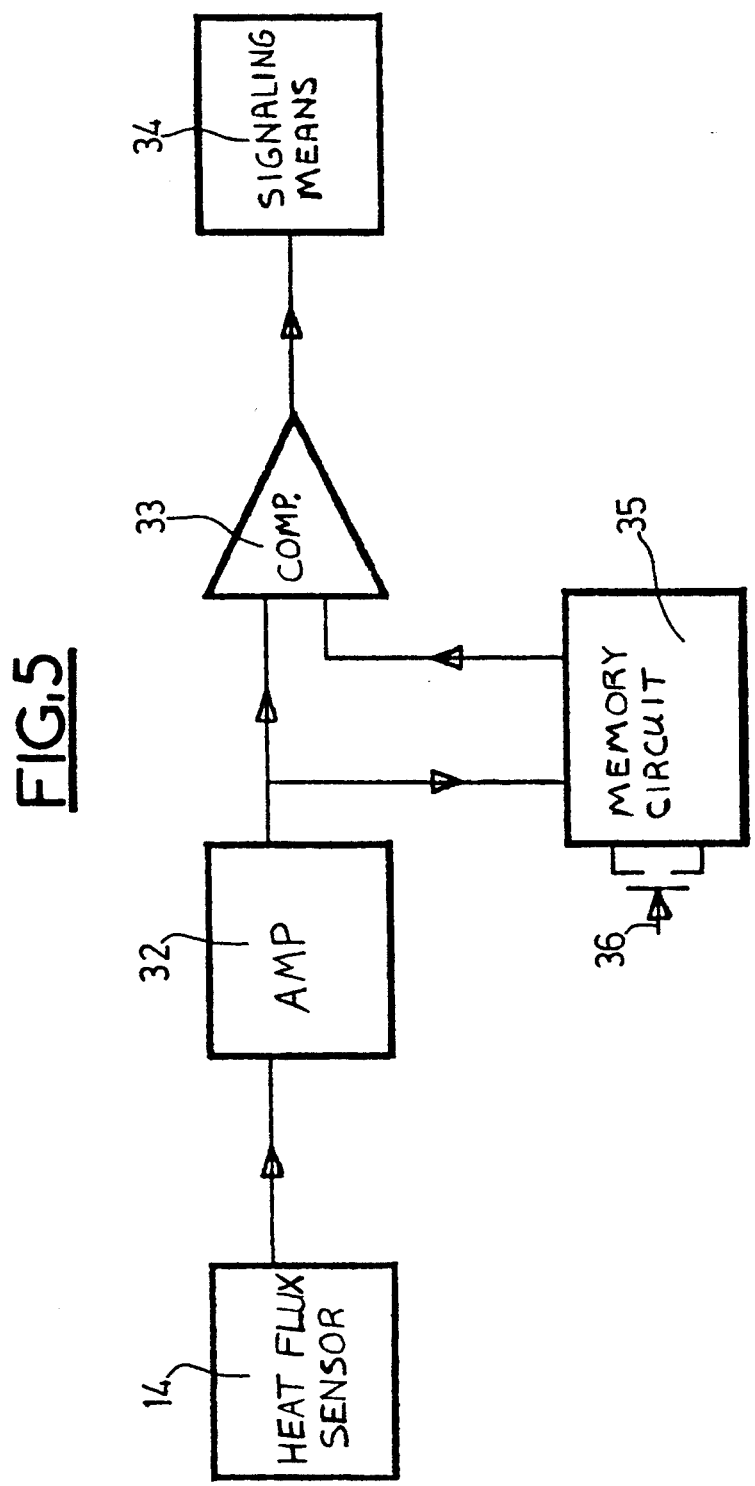

REMOTE TEMPERATURE AND/OR TEMPERATURE DIFFERENCE MEASURING DEVICE

The present invention relates to a temperature and/or temperature difference measuring device.

To make such measurements, it is known to use heat flux sensors which pick up the infrared radiation emitted by an area of the surface of a body, so as to deduce therefrom the temperature of the area and/or temperature differences.

However, these known devices perform poorly when measuring very small temperature differences and they are not easy to use.

The particular aim of the present invention is to remedy these disadvantages and provide a remote temperature and/or temperature difference measuring device which comprises a measuring circuit comprising a sensor of the heat flux emitted by an area of the surface of a body and a housing carrying this measuring circuit.

The remote temperature and/or temperature difference measuring device comprises, according to the present invention, a measuring circuit comprising a sensor of the heat flux emitted by an area of the surface of a body and a portable housing carrying the aforesaid sensor as well as means for marking the explored area.

According to one subject of the invention, the measuring circuit comprises a memory circuit connected to the heat sensor, a storage input unit such as a push button for effecting, at any chosen instant, the storage in this memory circuit of the signal coming from the aforesaid heat sensor, which then constitutes a reference signal, a comparator, one of the inputs of which receives the output signals from the heat sensor and the other input of which is connected to the said memory circuit providing a reference signal, this comparator providing at its output a signal corresponding to the difference between the said reference signal and the signal coming from the heat sensor, as well as signaling means connected to the output of the comparator and providing a signal corresponding to the aforesaid difference.

According to the invention, the said marker means preferably comprise means enabling the said housing to be stationed in a specified position with respect to the surface of the body and may furthermore be adjustable.

In a preferred variant, the said marker means comprise at least two light emitters whose light beams produce on the surface of the body light spots which, only when the housing is in the aforesaid specified position, are in specified positions with respect to one another.

According to the invention, the light emitters can advantageously be arranged on either side of the volume sighted or explored by the heat sensor and emitting light beams inclined with respect to the axis of this volume.

According to the invention, the said light emitters are preferably adjustable and are rotationally connected so as to vary the angle of their axis with respect to the axis of the explored or sighted volume.

According to the invention, at least one of the aforesaid traces preferably coincides with the surface of the said body explored by the heat sensor.

The device according to the invention can furthermore comprise means such that the explored or sighted volume is a cylinder.

In a preferred embodiment, the said housing has an aperture behind which is stationed a reflecting means, the heat sensor being stationed in front of this reflecting means, this reflecting means being such that the explored or sighted volume is cylindrical.

The said housing can also comprise a lateral grip for grasping, to the base of which is connected the aforesaid push button.

The present invention will be better understood on studying a remote temperature and/or temperature difference measuring device described by way of non-limiting example and illustrated by the drawing in which:

FIG. 4 represents a view corresponding to FIG. 3, of the temperature measuring device, in another position of adjustment;

FIG. 5 represents the block diagram of the aforesaid temperature measuring device.

Figure 1:
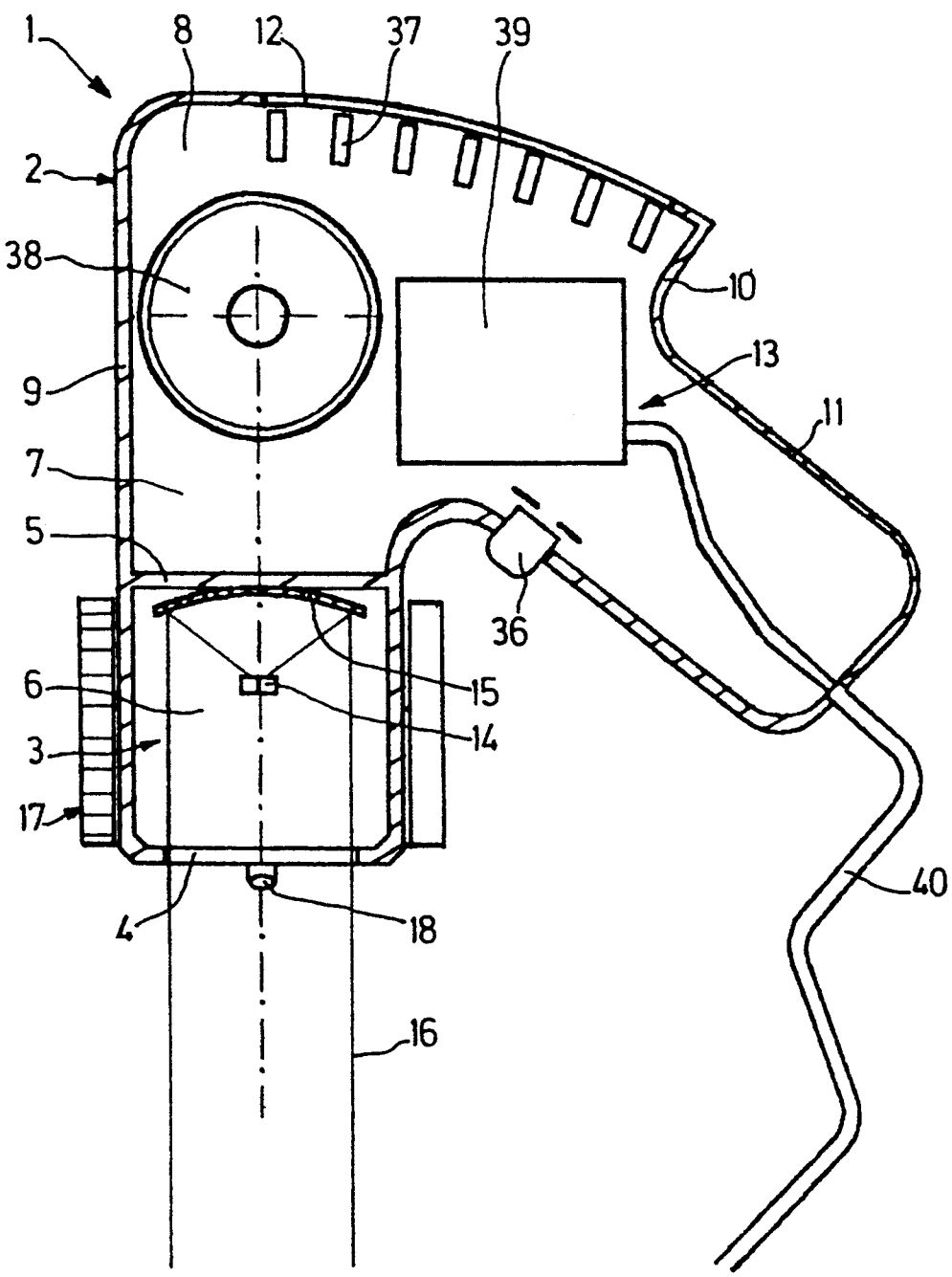
FIG. 1 represents a section in elevation of a temperature measuring device according to the present invention.
Figure 2:
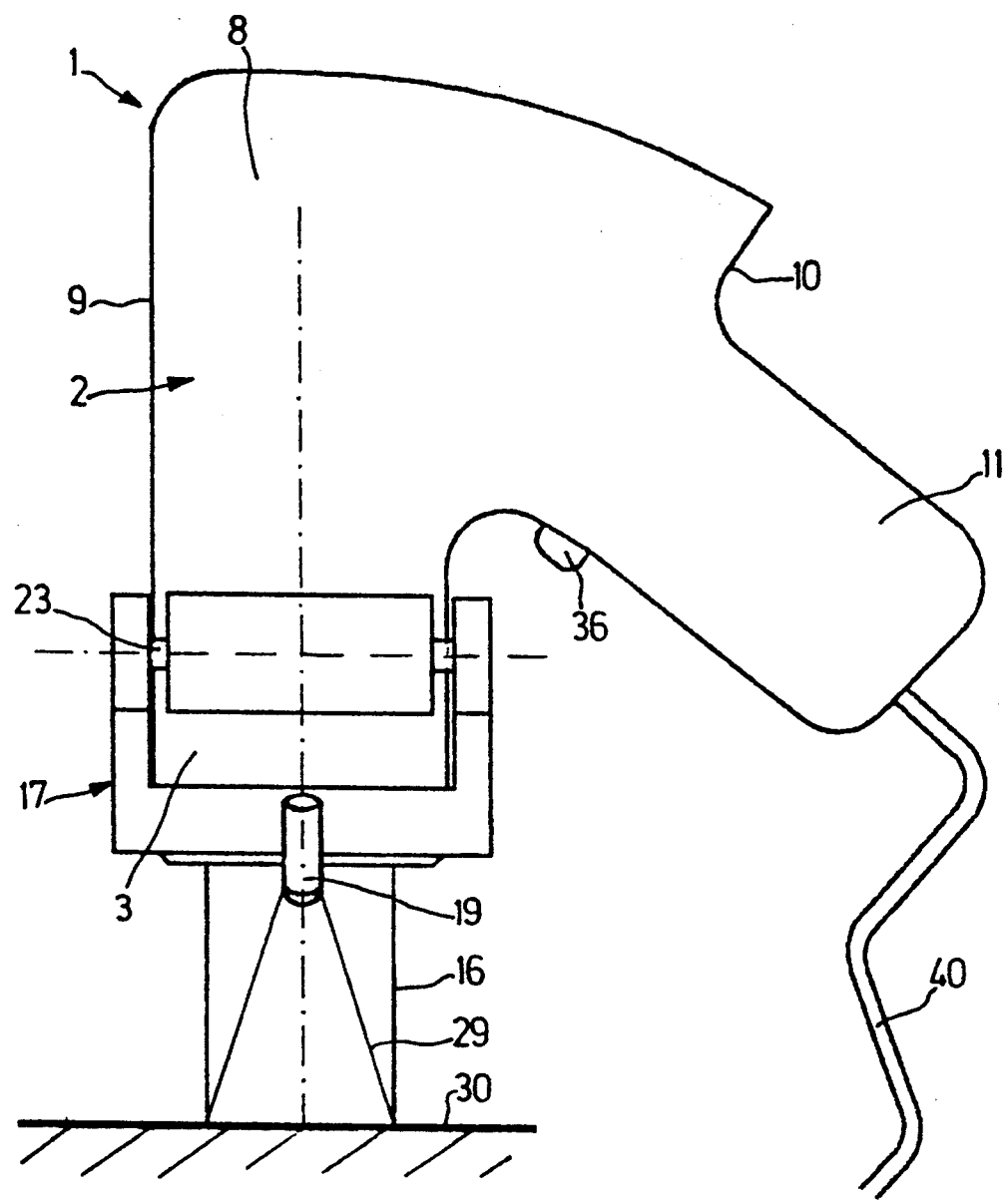
FIG. 2 shows an exterior view of the temperature measuring device represented in FIG. 1.

Referring to FIGS. 1 to 4, it can be seen that the remote measuring device represented, labeled in a general manner with the reference 1, comprises, for example, a plastic portable housing 2 which has a cylindrical or square cross sectional portion 3, one of the ends of which has an aperture 4 and which has, remote from this aperture, a transverse wall 5 delimiting a front chamber 6.

On the side of the wall 5, the housing 2 furthermore has a chamber 7 which has in one direction two parallel walls 8 and in the opposite direction a wall 9 and an inclined wall 10 through which the chamber 7 is prolonged inside a grip 11.

The walls 8 and the wall 9 prolong the portion 3. The grip 11 is inclined substantially at 45° with respect to the axis of the portion 3 and on the side of the latter and extends perpendicular to the wall 10. Opposite the wall 5, the chamber 7 is closed by a wall 12 curved in the direction of the walls 8.

The temperature measuring device 1 comprises a measuring circuit labeled in a general manner with the reference 13, which is carried by the housing 2.

This measuring circuit 13 comprises a heat flux sensor 14 which is mounted in the chamber 6 of the housing 2, remote from a parabolic mirror 15 fixed against the wall 5. The heat flux sensor 14 is fixed along the axis of the chamber 6 for example by radial lugs which are not shown. The reflecting mirror 15 is such that the face of the sensor 14 pointing towards the mirror 15 receives, through convergence, the heat flux seen, in a sighting cylinder 16, through the aperture 4 and around the sensor 14.

The temperature measuring device 1 furthermore comprises marker means, labeled in a general manner by the reference 17, serving in the positioning of the housing 2.

These marker means 17 comprises two light emitters constituted by light-emitting diodes 18 and 19 which are stationed on either side of the cylindrical portion 9 of the housing 2 and which are carried by two U-shaped supports 20 and 21 articulated horizontally on the housing 2 by parallel shafts 22 and 23 which are perpendicular to the axis of the cylindrical portion 3 of the housing 2. These two supports 20 and 21 are rotationally connected by toothed crown segments 24 and 25 and can be rotationally immobilized by virtue of a screw 26 which passes through a curved oblong hole 27 made in one of the wings of the support 21.

Thus, the light-emitting diodes 18 and 19 emit conical light beams 28 and 29 whose axes cut the axis of the parabolic mirror 15 at the same point.

In the example described, when the measuring device 1 is suitably stationed with respect to a surface 30, that is to say when the axis of its cylindrical portion 3, which is coincident with the axis of the parabolic mirror 15 which corresponds to the axis of the sighting cylinder 16, is stationed perpendicularly at the proper distance from the surface 30, the two light traces of the light beams 28 and 29 on the surface 30 must be substantially coincident, these two superimposed traces covering and coinciding with the area of the surface 30 seen by the sensor 14 through the sighting cylinder 16.

If the measuring device 1 is not at the proper distance or i.e. is inclined with respect to the surface 30, the traces are not in the desired position with respect to one another.

Figure 3:
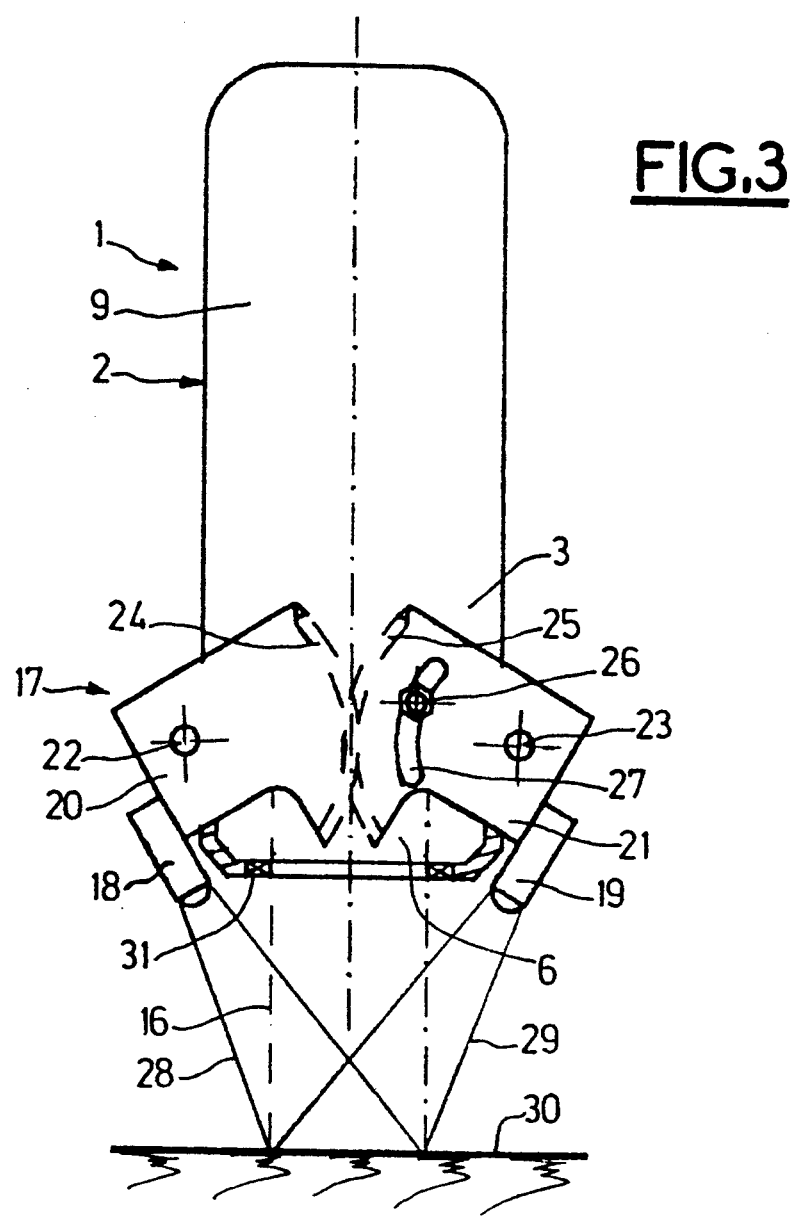
FIG. 3 represents a view of the left side of the temperature measuring device represented in FIG. 1.

As FIG. 3 shows, the diameter of the sighting cylinder 16 can be varied by stationing in the aperture 4 of the chamber 6 a diameter-reducing ring 31 which could be replaced by an adjustable diaphragm.

In order optionally to adapt the marker means 17 to this new sighting volume, it suffices to modify the angular adjustment of the supports 21 in order to modify the angle made by the beams 28 and 29 emitted by the light-emitting diodes 18 and 19.

Referring now to FIG. 5, it can be seen that the measuring circuit 13 comprises an amplifier 32 which receives the signals provided by the heat sensor 14, a comparator 33, one of the inputs of which is connected to the output of the amplifier 32 and the output of which is connected to a signaling means 34.

The measuring circuit 13 also comprises a memory circuit 35 the input of which is connected to the output of the amplifier 32 and the output of which is connected to the other input of the comparator 33. This memory circuit 35 serves to store at a given instant the output signal from the amplifier 32, this operation being carried out by virtue of a storage command input unit consisting in the example of a push button 36 provided at the base of the grip 11, on the side of the housing 2.

In the example represented in FIG. 1, the signaling means 34 consist on the one hand of a series of luminous diodes 37 stationed on the wall 12 of the housing 2 and a warning sounder or speaker 38 stationed in the chamber 7 of this housing.

The amplifier 32, the comparator 33 and the memory circuit 35, as well as the ancillary components which are not shown, are for example carried by a printed circuit 39 mounted in the chamber 7 of the housing 2 and supplied via an electrical load 40 passing through the end of the grip 11.

To use the measuring device 1 described above, the following procedure may be undertaken.

Firstly, the diameter of the aperture 4 is adjusted to the desired diameter in order to fix a diameter particular to the sighting cylinder 16. The inclination of the light-emitting diodes 18 and 19 is adjusted, thus determining a particular measuring distance with respect to the surface 30 to be explored.

The measuring device 1 is held in the hand by the grip 11.

The measuring device 1 is stationed at the proper distance and at the proper angular position with respect to the surface 30, this position being attained, in the example, when the two light spots obtained via the light beams from the light-emitting diodes 18 and 19 are coincident and substantially circular.

A pressure is exerted on the switch 36 so as to effect the storage in the memory circuit 35 of the output signal from the amplifier 32 corresponding to the measurement of the heat flux emitted by the corresponding area of the surface 30 towards the heat sensor 14.

The measuring device 1 is moved so as to bring it, as before, into the proper position with respect to another area of the surface 30.

The comparator 33 then compares the output signal from the amplifier 32, which corresponds to the heat flux emitted by this other area towards the heat sensor 14, with the signal stored in the memory circuit 35.

The result of this difference is transmitted to the signaling means 34, which in the example represented in FIG. 1 comprises the loudspeaker 38 producing a corresponding specified sound level and/or modulation and a corresponding specified number of diodes 37 being lit up.

The operator can then ascertain whether the two areas compared are at the same temperature or are at different temperatures and can qualify this difference.

Naturally, if the signal stored in the memory circuit 35 corresponds to a particular known temperature, the operator can not only detect temperature differences between several areas but also the temperature of each of the areas, provided for example by the luminous diodes 37.

The operator can, at any instant which he chooses, modify the reference signal stored in the memory circuit 35. To do this, he need only actuate the push button 36.

Owing to the fact that the sighting or exploration volume 16 is cylindrical and by virtue of the optical marker means 17, the measuring device 1 makes it possible to qualify very small temperature differences, at least down to a tenth of a degree, in particular for distances of between 0.10 m and 1 m, it being possible for the diameter of the sighting cylinder to be between 0.015 m and 0.04 m.

The measuring device described above can advantageously be used to measure temperature differences between various areas on the surface of a human or animal body, so as to determine or confirm a medical diagnosis. Indeed, its structure is designed so that it is very easily manipulated and so that it enables temperature differences to be measured by taking a reference area which it can change when it wishes, in particular so as to carry out comparisons of temperature in zones which are associated from a medical point of view.

The present invention is not limited to the example described above. In particular, the luminous marker diodes could produce different traces in different positions of adjustment on the surface to be explored and could be replaced by other marker means, especially optical, in particular by an emitter stationed just in front of the sensor and emitting a light ray along the axis of the sighting cylinder towards the surface to be explored. The circuit for measuring heat flux could be different especially as regards its arrangements in the portable housing and its signaling means which could comprise for example graphical printing means possibly outside the housing or other means. The push button or any command input unit could be outside the housing.

We claim:

1. Device for measuring temperature and/or a temperature difference of a surface, comprising:
   a housing;
   a measuring circuit supported by said housing, said measuring circuit including
   a heat flux sensor with output,
   a memory circuit in communication with the output of said heat flux sensor,
   an input unit adapted to activate said memory circuit so as to memorize an output signal from the output of said heat flux sensor while the heat flux sensor senses a first explored surface area, and the memorized output signal constituting a reference signal,
   a comparator having a first input connected to said memory circuit and a second input connected to the output of said heat flux sensor, and said comparator having an output for delivering a signal corresponding to any difference between the reference signal and a subsequent output signal of said heat flux sensor, and
   a signaling means connected with the output of said comparator for providing a signal corresponding to any difference between the reference signal and said subsequent output signal; and
   marking means for designating an area on said surface for sensing by said heat flux sensor, and said marking means being supported by said housing.

2. Device according to claim 1, wherein said marking means includes means for positioning said housing at a specified position with respect to the surface of a body.

3. Device according to claim 1, wherein said marking means includes an adjustment assembly for varying in size the designated area.

4. Device according to claim 1, wherein said marking means includes at least two light emitters (18, 19) which are adapted to produce light beams that produce on the surface of a body light spots which, only when the housing (2) is in a specified position, are in specified positions with respect to one another.

5. Device according to claim 4 wherein said light emitters (18, 19) are arranged on opposing sides of wall surfaces of said housing and are oriented so as to emit light beams at an incline which converge at a convergence location on the surface of the body.

6. Device according to claim 5, wherein said light emitters (18, 19) are adjustably supported on said housing and are rotationally connected to said housing such that the angle of incline of the light beams and a distance between the heat flux sensor and the convergence location are adjustable.

7. Device according to claim 4 wherein said housing includes a front chamber in which said heat flux sensor is positioned, and said front chamber having an aperture formed therein and an aperture ring for adjusting the aperture size.

8. Device according to claim 7, wherein said light emitters are dimensioned and arranged so as to form coinciding light spots which have a diameter in common with that of said aperture when said housing is at a specified position.

9. Device according to claim 8, further comprising a reflecting means, said reflecting means being positioned such that the heat sensor (14) is stationed between the reflecting means (16), and the explored surface.

10. Device according to claim 1, wherein said housing (2) comprises a lateral grip (11) for grasping, and said input unit includes a push button (36).

11. A device according to claim 2, wherein said marking means (17) are adjustable.

12. Device as recited in claim 1 wherein said marking means is dimensioned and arranged for assisting an operator of said device in determining whether said heat flux sensor, while sensing at a second explored surface area, is at a similar distance and angular orientation with respect to the second explored surface area as was said heat flux sensor when sensing said first explored surface area.

13. A device for measuring temperature and/or a temperature difference comprising:
   a housing;
   a measuring circuit supported by said housing, said measuring circuit including
   a heat flux sensor with output,
   a memory circuit in communication with the output of said heat flux sensor,
   an input unit adapted to activate said memory circuit so as to memorize an output signal from the output of said heat flux sensor as a reference signal,
   a comparator having a first input connected to said memory circuit and a second input connected to the output of said heat flux sensor, and said comparator having an output for delivering a signal corresponding to any difference between the reference signal and a subsequent output signal of said heat flux sensor, and
   a signaling means connected with the output of said comparator for providing a signal designating any difference between the reference signal and the subsequent output signal of said heat flux sensor; and
   a marking assembly supported by said housing, said marking assembly including a first light emitter supported on a first support, which first support is adjustably secured to said housing, a second light emitter supported on a second support, which second support is adjustably secured to said housing and in engagement with said first support so as to coordinate movement of said first and second light emitter, and an immobilizer member for fixing in place said first and second light emitters such that light beams produced by said emitters converge at a location removed from said housing.

14. A device as recited in claim 13 further comprising a mirror (15) positioned such that said heat flux sensor is positioned between the mirror and a surface area being measured.

15. A device as recited in claim 13 wherein said housing includes a handle grip and said input unit includes a push button or switch supported by said handle grip.

16. A device as recited in claim 13 wherein said signaling means includes a speaker.

17. A device as recited in claim 13 wherein said housing includes an extended portion with aperture formed therein, said extended portion defining a chamber within which is supported said heat flux sensor.

18. A device as recited in claim 17 further comprising an aperture ring for varying aperture size of the aperture of said extended portion.

19. A device as recited in claim 18 further comprising a parabolic reflector mirror positioned at an end of said chamber and said reflector mirror having a central axis which intersects said heat flux sensor and coincides with a central axis of the aperture.

20. A device as recited in claim 17 wherein said marking assembly is supported by said extended portion.

21. Device as recited in claim 1 wherein said signaling means includes luminous diodes.

22. A device as recited in claim 13 wherein said signaling means includes luminous diodes.

* * * * *